Oct. 16, 1928.

A. A. MORRIS 1,687,778

CLUTCH AND BRAKE ASSEMBLY FOR POWER DRIVEN MACHINES

Filed Feb. 27, 1928      2 Sheets-Sheet 1

Inventor.
Alfred A Morris
Harry A Totten
By          Attorney

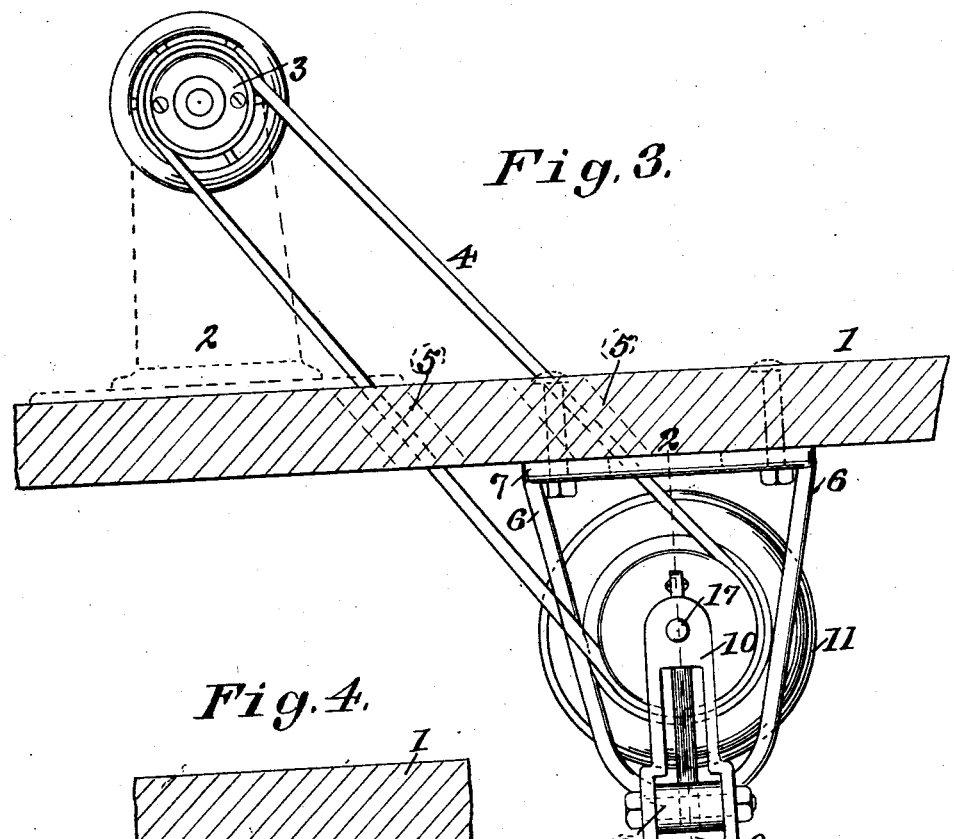
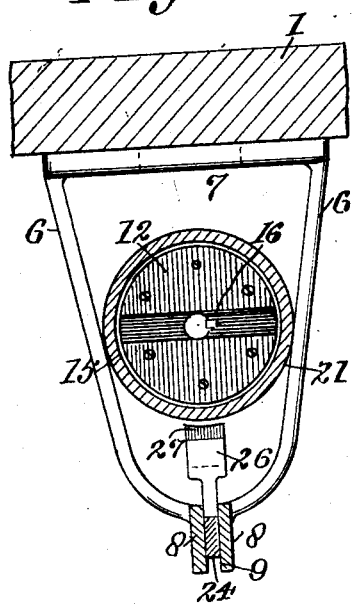

Patented Oct. 16, 1928.

1,687,778

UNITED STATES PATENT OFFICE.

ALFRED A. MORRIS, OF LOS ANGELES, CALIFORNIA.

CLUTCH AND BRAKE ASSEMBLY FOR POWER-DRIVEN MACHINES.

Application filed February 27, 1928. Serial No. 257,328.

This invention relates to improvements in clutch and brake assembly for power driven machines, and more particularly for use in connection with sewing machines wherein the operator by the actuation of the clutch is able to quickly start the sewing mechanism to operate at high speed, and when the desired sewing is finished to immediately bring the same to a state of rest. Speed in starting and stopping of a sewing machine, particularly when piece work is being performed thereon, is essential to enable the operator to perform the work rapidly, obtain the desired output, and to earn the maximum sum paid in the piece work industry.

In the clothing manufacturing, and shoe making and repairing business, power sewing machines are employed, and the present invention has for its principal object to perfect the rapidity of operation in starting and stopping of these machines whereby the completion of the sewing operation can be expedited and the time of the workman conserved. To provide a clutch and brake assembly structure of simple construction, having a maximum area of engaging surface and equipped with operating means whereby the driven element is immediately and automatically arrested from rotation on its disengagement from the driving element, and is immediately operated at a relatively high speed when in engagement with the driving element on the release of the brake element.

The invention consists broadly in complementary axially aligned shafts, one connected with the power source and each carrying one element of a complementary clutch structure, the members of such structure being movable into and out of engagement with each other on the manipulation of a single lever, and one of which has a brake applied thereto immediately on its disengagement from its complementary member.

With the above mentioned and other objects in view, the invention consists in the novel construction and combination of parts hereinafter described, illustrated in the accompanying drawings, and set forth in the claim hereto appended, it being understood that various changes in the form, proportion, size and minor details of construction within the scope of the claim may be resorted to without departing from the spirit or sacrificing any of the advantages of the invention.

To more fully comprehend the invention, reference is directed to the accompanying drawings, wherein:—

Fig. 3 is a view in end elevation of the structure illustrated in Fig. 1, and

Fig. 4 is a detail sectional view on line 4—4 of Fig. 1.

Figure 1:
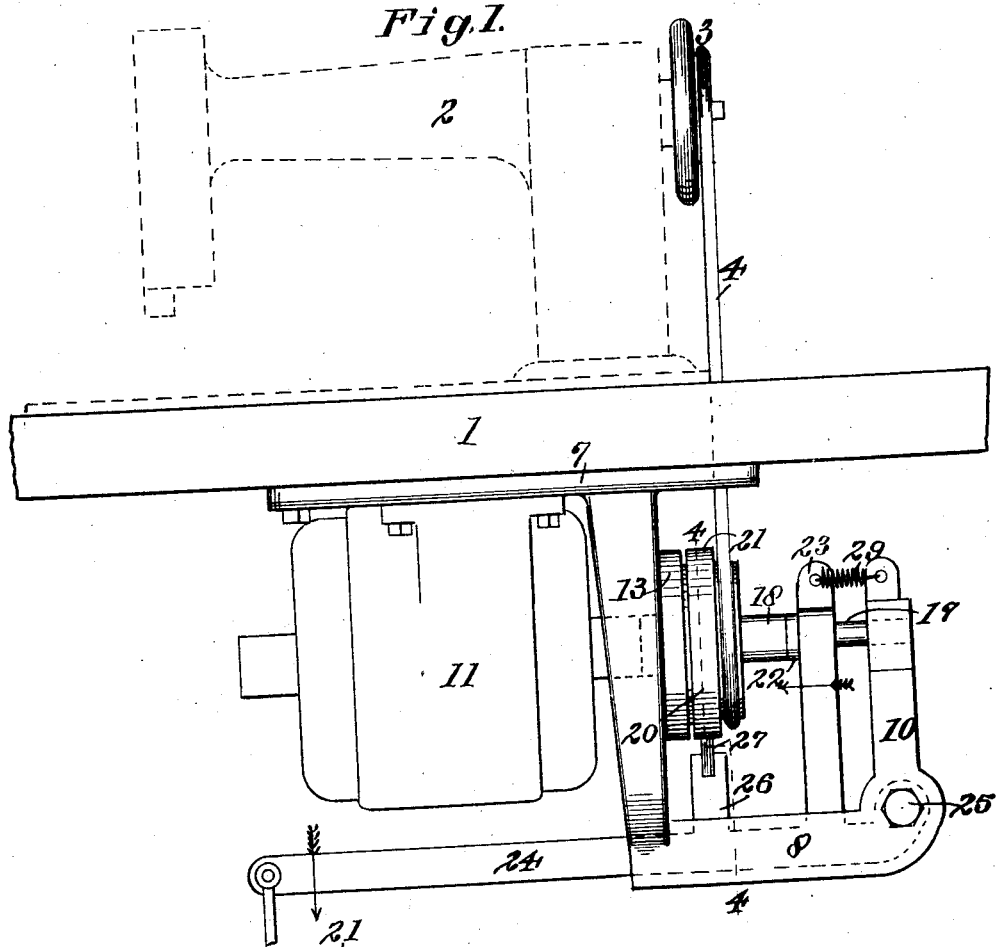
Fig. 1 is a view in elevation of the preferred embodiment of my invention.
Figure 2:
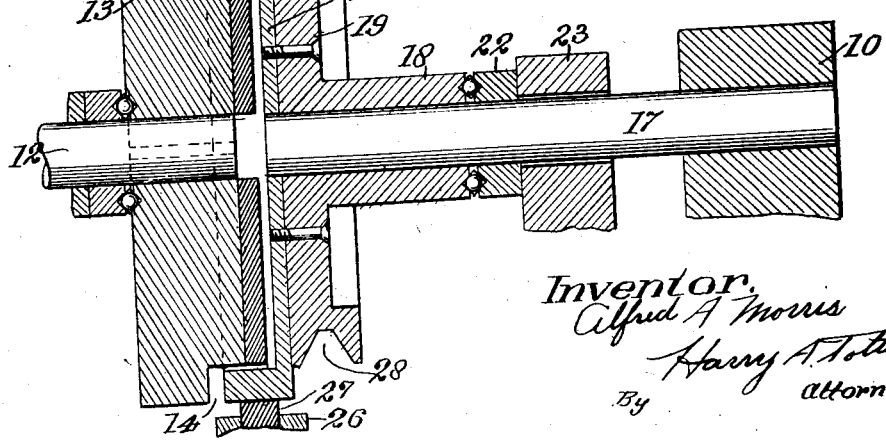
Fig. 2 is a view in vertical section through the clutch structure and shafts, said view being taken on line 2—2 of Fig. 3.

In the drawings wherein like characters of reference designate corresponding parts, 1 indicates a table or bed for a sewing machine conventionally illustrated in outline and indicated by the numeral 2, the sewing machine being provided with the wheel 3 formed with a belt groove around which operates the belt 4 passing through openings 5 in the bed or table 1. Carried on the under surface of the bed or table 1 at a point either in advance or in rear of the machine 2 is a frame 6 open in end elevation, as in Figs. 3 and 4, and the same consisting of an attaching plate 7, depending from which are the frame members 6 united at their lower ends by an arm 8 longitudinally slotted at 9, and at its end provided with an upstanding shaft supporting bracket portion 10. Bolted to the plate 7 is a conventional electric motor 11, the armature shaft 12 of which is disposed preferably in parallel alignment above the arm 8 of the frame 6, and carries in its end a weighted clutch disk 13, the periphery of which is stepped circumferentially at 14, and the outer face of the member 13 carries a removable clutch surface or disk 15 of leather or other suitable material preferably detachably secured thereto. A key 16 unites the shaft 12 and disk 13 to rotate as a unit. The arm 10 mounts a stub shaft 17, disposed in axial alignment with the shaft 12, as illustrated in Fig. 2. The shaft 17 is held from rotation, but the same rotatably mounts the hub 18 of the clutch disk 19 to the face of which is attached a surface 20 having a peripheral circumferential brake flange 21, the same overlying the stepped portion 14 in the disk 13. A thrust collar 22 cooperates with the outer end of the hub 18, and bearing on the same is the free end of a lateral extension 23 carried by a lever 24 disposed to lie in the slot 9, the lever being fulcrumed at its outer end to the walls of the slot by a bolt 25. The lever extends parallel with shafts 17 and 12, and at a point in alignment with the brake surface 21 is provided with a lateral extension 26 carrying at its end a shoe 27 for engagement with the brake surface 21, as illustrated in Figs. 1 and 2 of the drawings. The member 19 is formed with peripheral groove 28 for receiving the belt 4 after the same passes through slots or openings 5 in the table or base 1. A spring 29 connects the ends of arms 10 and 23, and the action of the spring is to normally relieve endwise pressure on the hub 18 enabling the separation of the clutch members and to lift said shoe 27 into contact with the braking surface 21.

The lever 24 is actuated in any suitable manner by the machine operator, and with the motor shaft 25 rotating at all times, it will be readily apparent that by depressing lever 24 a slight movement of the extension 23 will exert end pressure on the hub 18 through the thrust collar 22 and force the clutch members into engagement, the shoe engaging surface or area between the two ensuring a rapid grip or takeup action, and the quick release of the shoe 27.

It will be observed that the weighted clutch disk 13 provides, due to its diameter and weight, a fly wheel on shaft 12. With the motor armature continuously rotating as it does in this apparatus, the inertia of the disk or fly wheel 13 is sufficient to offset any retarding tendency of the sewing machine on the engagement of the clutch surfaces. This structure enables the machine 2 to immediately operate at high speed as soon as the clutch members are engaged, and permits the use of a relatively small motor. The relatively light structure of members 19 and 21 enables the quick stopping of the machine on the disengagement of the clutch elements and the application of the brake and the relative arrangement of the parts, promotes quick assembly and demounting of the parts and accomplishes quick starting and stopping of the machine under all conditions.

I claim:

A clutch and brake assembly for power driven machines comprising, in combination with a supporting base, a yoke frame extending laterally from its face and terminating in parallel spaced arms united at their ends by a connecting bracket disposed in parallel spaced relation to the yoke forming members, a motor carried by the base and provided with an armature shaft in parallel alignment with said arms, a shaft fixed to said bracket and extending in parallel alignment with said armature shaft, a clutch member carried by the armature shaft, a clutch member carried by the fixed shaft, rotatable thereon and slidable horizontally thereof into and out of engagement with its cooperating clutch member, a lever extending between said arms and fulcrumed at its end to the base of said bracket, said lever provided with a lateral extension for engaging one of said clutch members to force the same into contact with the other, and further provided with a brake shoe for cooperating with the periphery of said clutch member to arrest its rotation on its disengagement from the other clutch member, and means for automatically holding said lever at the end of its movement in one direction.

In testimony whereof I have signed my name to this specification.

ALFRED A. MORRIS.